United States Patent
Sahu et al.

(10) Patent No.: US 9,521,612 B2
(45) Date of Patent: Dec. 13, 2016

(54) NOTIFYING AVAILABILITY OF INTERNET PROTOCOL MULTIMEDIA SUBSYSTEM SERVICES

(71) Applicant: QUALCOMM Incorporated, San Diego, CA (US)

(72) Inventors: Debesh Kumar Sahu, Hyderabad (IN); Naresh Gundu, Hyderabad (IN); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 14/488,049

(22) Filed: Sep. 16, 2014

(65) Prior Publication Data

US 2016/0029303 A1    Jan. 28, 2016

Related U.S. Application Data

(60) Provisional application No. 62/028,231, filed on Jul. 23, 2014.

(51) Int. Cl.
*H04W 48/20* (2009.01)
*H04W 48/18* (2009.01)
(Continued)

(52) U.S. Cl.
CPC ............. *H04W 48/20* (2013.01); *H04W 36/14* (2013.01); *H04W 40/244* (2013.01);
(Continued)

(58) Field of Classification Search
CPC .... H04W 36/14; H04W 40/244; H04W 48/18; H04W 48/08; H04W 48/20; H04W 88/06; H04W 84/042; H04W 88/10
See application file for complete search history.

(56) References Cited

U.S. PATENT DOCUMENTS

| | | | |
|---|---|---|---|
| 7,657,239 B2 | 2/2010 | Doradla et al. | |
| 8,073,152 B1 * | 12/2011 | Reuss | H04R 5/033 381/367 |

(Continued)

FOREIGN PATENT DOCUMENTS

| | | |
|---|---|---|
| EP | 1743491 A1 | 1/2007 |
| WO | WO 2007 080028 A1 | 7/2007 |
| WO | WO-2008011111 A2 | 1/2008 |

OTHER PUBLICATIONS

ISA/EPO, International Search Report and Written Opinion of the International Searching Authority, Int'l Appl. No. PCT/US2015/036331, Oct. 12, 2015, European Patent Office, Rijswijk, NL, 12 pgs.

(Continued)

*Primary Examiner* — Brian D Nguyen
(74) *Attorney, Agent, or Firm* — Holland & Hart LLP

(57) ABSTRACT

Methods, systems, and devices are described for indicating, by a multimode access point, an availability of a service on a first RAT to a mobile device via a second RAT. The multimode access point may determine whether a service is available from a base station on the first RAT, e.g., a VoLTE service from a LTE base station. The multimode access point may send an indication to the mobile device of the available services. The mobile device may configure a voice call session based on the available services and initiate the voice call session accordingly.

18 Claims, 13 Drawing Sheets

(51) Int. Cl.
*H04W 40/24* (2009.01)
*H04W 36/14* (2009.01)
*H04W 48/08* (2009.01)
*H04W 88/10* (2009.01)
*H04W 84/04* (2009.01)
*H04W 88/06* (2009.01)

(52) U.S. Cl.
CPC ........... *H04W 48/08* (2013.01); *H04W 48/18* (2013.01); *H04W 84/042* (2013.01); *H04W 88/06* (2013.01); *H04W 88/10* (2013.01)

(56) References Cited

U.S. PATENT DOCUMENTS

| | | | |
|---|---|---|---|
| 8,620,319 B1 | 12/2013 | Thandu et al. | |
| 2004/0052223 A1* | 3/2004 | Karaoguz | G06Q 30/02 370/328 |
| 2004/0063426 A1 | 4/2004 | Hunkeler | |
| 2005/0097356 A1* | 5/2005 | Zilliacus | H04W 36/0066 726/4 |
| 2011/0086614 A1* | 4/2011 | Brisebois | H04K 3/42 455/411 |
| 2012/0069776 A1 | 3/2012 | Caldwell et al. | |
| 2012/0230244 A1 | 9/2012 | Bienas et al. | |
| 2012/0281685 A1 | 11/2012 | Kotecha et al. | |
| 2013/0102313 A1 | 4/2013 | Tinnakornsrisuphap et al. | |
| 2014/0029428 A1* | 1/2014 | Lin | H04L 5/0048 370/235 |
| 2014/0233386 A1* | 8/2014 | Jamadagni | H04W 36/22 370/235 |
| 2014/0355523 A1* | 12/2014 | Congdon | H04W 76/02 370/328 |
| 2014/0369217 A1* | 12/2014 | Kim | H04W 16/12 370/252 |
| 2015/0012971 A1* | 1/2015 | Ram | H04W 12/08 726/3 |
| 2016/0007331 A1* | 1/2016 | Gauba | H04W 72/0406 370/329 |

OTHER PUBLICATIONS

Paisel, "Seamless Voice Over LTE," 2010 IEEE 4th International Conference on Internet Multimedia Services Architecture and Application(IMSAA), Bangalore, Dec. 15-17, 2010, 5 pgs., ISBN 978-1-4244-7932-0, Institute of Electrical and Electronics Engineers.

Riegel, "IEEE 802 Enhanced Network Detection and Selection," IEEE DRAFT; omniran-13-0063-00/0000, Aug. 26, 2013, 12 pgs., XP_068059572A, Institute of Electrical and Electronics Engineers.

* cited by examiner

NOTIFYING AVAILABILITY OF INTERNET PROTOCOL MULTIMEDIA SUBSYSTEM SERVICES

CROSS REFERENCES

The present Application for Patent claims priority to U.S. Provisional Patent Application No. 62/028,231 by Sahu et al., entitled "NOTIFYING AVAILABILITY OF INTERNET PROTOCOL MULTIMEDIA SUBSYSTEM SERVICES," filed Jul. 23, 2014, assigned to the assignee hereof, and expressly incorporated by reference herein.

BACKGROUND

The following relates generally to wireless communication, and more specifically to notifying whether an Internet Protocol (IP) Multimedia Subsystem (IMS) service is available to a mobile device. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communications system may include access points supporting communication for multiple devices. Access points may communicate with devices on downstream and upstream links. Each access point has a coverage range, which may be referred to as the coverage area of the access point. Some access points may be multimode access points simultaneously supporting communications over multiple radio access technologies. For example, a multimode access point may concurrently communicate with a mobile device (i.e., a wireless station) over a WLAN or Wi-Fi network and a cellular base station over a cellular network. The multimode access point may provide bridging services (e.g., wireless fidelity (Wi-Fi) hotspot services) between the mobile device and the base station where the mobile device accesses services of the base station through the multimode access point.

A mobile device (e.g., cellular phone, laptop computer, tablet computer, desktop computer, etc.) communicating with a multimode access point may desire to access a service of a base station in communication with the multimode access point over a cellular network. In some cases, the availability of the service for the mobile device depends on the configuration of the base station, channel conditions between the multimode access point and the base station, network loading, or other factors. Because the multimode access point maintains the connection with the base station, the mobile device may be unaware of what services are available from the base station and, therefore, initiate an activity (e.g., a voice call) based on an assumption that the service is available. When the service is not available, however, attempted access to the service may time out before ultimately failing, thereby introducing unnecessary delay.

SUMMARY

The described features generally relate to one or more improved systems, methods, and/or apparatuses for informing a mobile device whether a service is available. The mobile device may communicate with a multimode access point on a first communication link (e.g., a first radio access technology (RAT)) and the multimode access point may communicate with the base station on a second communication link (e.g., a second RAT). The multimode access point may determine whether the service is available from the base station and inform the mobile device accordingly. The service from the base station may be via the RAT and the multimode access point may inform the mobile device about the availability of the service via the second RAT. The first RAT may be a cellular communications network and the second RAT may be a wireless local area network (WLAN), for example. The mobile device may, based on the availability of the service, configure a voice call session based on the availability of the service and initiate the voice call session according to the configuration. In some examples, the mobile device may include a voice over WLAN (VoWLAN) client operating on the mobile device and the service may be a voice over long term evolution (VoLTE) service.

In a first illustrative set of examples, a method for wireless communication is described. The method may include: determining, by a multimode access point, whether a service is available for a mobile device on a first radio access technology (RAT); and providing, to the mobile device, an indication of the availability of the service on the first RAT via a second RAT. In some aspects, providing the indication of the availability of the service on the first RAT via the second RAT may include sending a beacon to the mobile device via the second RAT. The beacon may include a first information element indicative of the first RAT and a second information element indicative of the availability of the service on the first RAT. The first RAT may be a cellular communications network and the service may be a voice over Long Term Evolution (LTE) (VoLTE) service.

In some aspects, determining whether the service is available may include: intercepting a message from a network entity to the mobile device; modifying an information element included in the message to indicate the availability of the service on the first RAT; and forwarding the message with the modified information element to the mobile device. The message may include a general advertisement service initial response message. The information element may be a connection capability information element. The first RAT may be a cellular communications network and the second RAT may be a wireless local area network. The service may be a semi-persistent scheduling service.

In a second illustrative set of examples, an apparatus for wireless communication is described. The apparatus may include: a service manager configured to determine, by a multimode access point, whether a service is available for a mobile device on a first radio access technology (RAT); and a transmitter configured to provide, to the mobile device, an indication of the availability of the service on the first RAT via a second RAT. The transmitter configured to provide the indication of the availability of the service on the first RAT via the second RAT may be further configured to send a beacon to the mobile device via the second RAT. In some aspects, the beacon may include a first information element indicative of the first RAT and a second information element indicative of the availability of the service on the first RAT. The first RAT may be a cellular communications network and the service may be a voice over Long Term Evolution (LTE) (VoLTE) service.

In some aspects, the service manager configured to determine whether the service is available may be further configured to: intercept a message from a network entity to the mobile device; and modify an information element included in the message to indicate the availability of the service on the first RAT; and wherein the transmitter is further configured to forward the message with the modified information element to the mobile device. The message may be a general advertisement service initial response message. The information element may include a connection capability information element. The first RAT may be a cellular communications network and the second RAT may be a wireless local area network. The service may be a semi-persistent scheduling service.

In a third set if illustrative examples, a method for wireless communication is described. The method may include: receiving, via a second radio access technology (RAT), an indication of the availability of a service on a first RAT; determining, by a mobile device, a configuration for a voice call session based on the availability of the service on the first RAT; and initiating the voice call session according to the determined configuration. The method may include de-registering the service on the mobile device in response to receiving an indication that the service is not available on the first RAT. Receiving the indication of the availability of the service on the first RAT may include receiving a beacon via the second RAT.

In some aspects, the beacon may include a first information element indicative of the first RAT and a second information element indicative of the availability of the service on the first RAT. The first RAT may be a cellular communications network and the service may be a voice over Long Term Evolution (LTE) (VoLTE) service available for the mobile device. The first RAT may be a cellular communications network and the second RAT may be a wireless local area network. The service may be a semi-persistent scheduling service.

In a fourth set of illustrative examples, an apparatus for wireless communication is described. The apparatus may include: a receiver configured to receive, via a second radio access technology (RAT), an indication of the availability of a service on a first RAT; and a voice call session manager configured to determine, by a mobile device, a configuration for a voice call session based on the availability of the service on the first RAT, and to initiate the voice call session according to the determined configuration.

In some aspects, the voice call session manager may be further configured to de-register the service on the mobile device in response to receiving an indication that the service is not available on the first RAT. The receiver configured to receive the indication of the availability of the service on the first RAT may be further configured to receive a beacon via the second RAT.

In some aspects, the beacon may include a first information element indicative of the first RAT and a second information element indicative of the availability of the service on the first RAT. The first RAT may be a cellular communications network and the service may be a voice over Long Term Evolution (LTE) (VoLTE) service available for the mobile device.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to a multimode access point (AP) informing a mobile device of the availability of a service on a first radio access technology (RAT) via a second RAT. The mobile device may be connected to and communicate with the multimode AP via the second RAT (e.g., a wireless local area network (WLAN)). The multimode AP may be connected to and communicate with a base station via the first RAT, (e.g., a cellular communications network). The multimode AP may determine whether a service is available from the base station on the first RAT and send information to the mobile device to indicate the service availability via the second RAT. The mobile device may initiate a voice call or perform another action based at least in part on the availability of the service.

In some examples, the service may be a voice over WLAN (VoWLAN) service and the mobile device may initiate a VoWLAN call session upon receiving an indication that the VoWLAN service is available. If the mobile device receives an indication that the VoWLAN service is not available, it may initiate the voice call configured according to a circuit-switched RAT, for example. The mobile device may register or de-register with an internet protocol multimedia system (IMS) based on receiving an indication that the VoWLAN service is available or unavailable, respectively.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
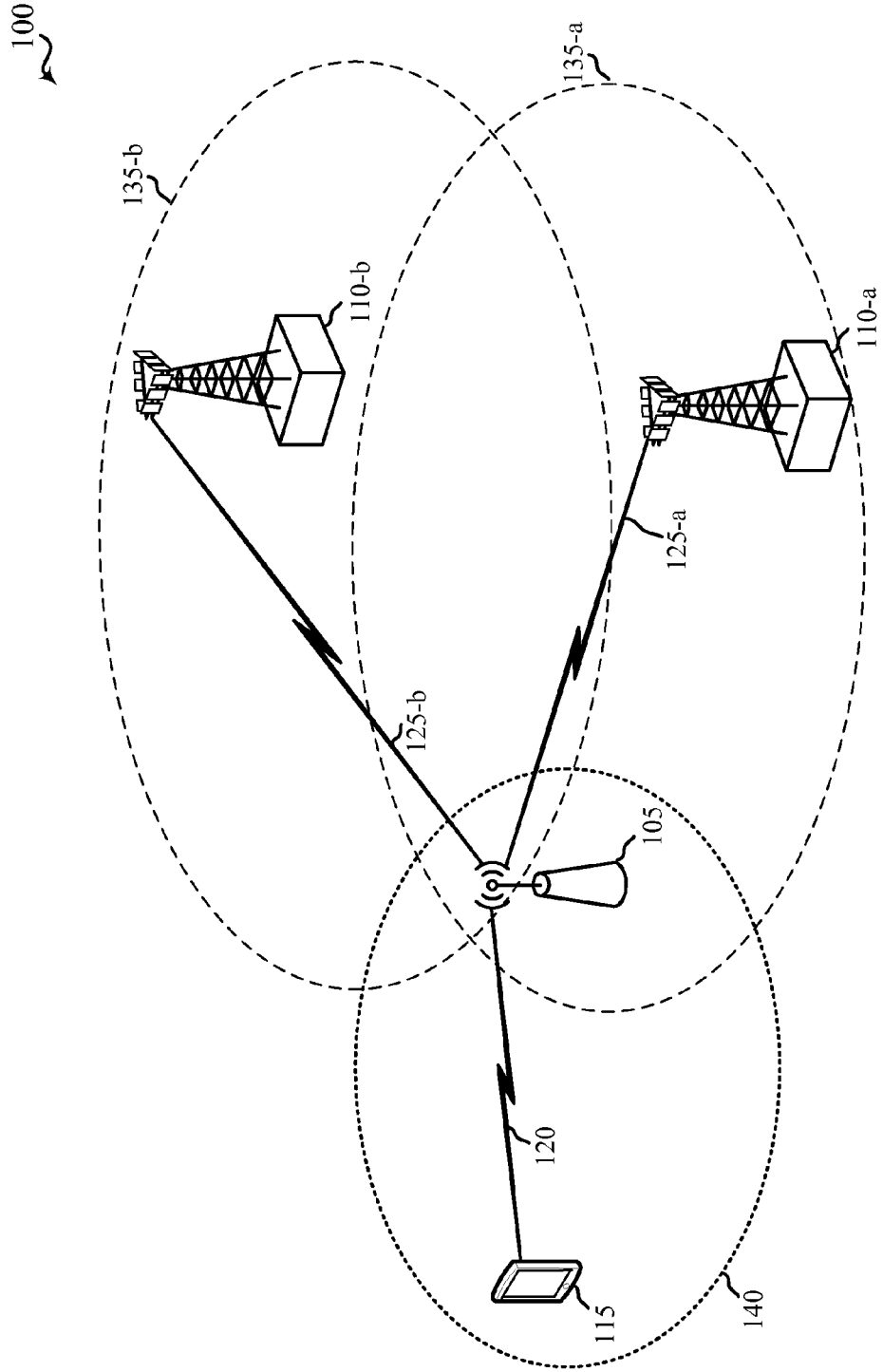
FIG. 1 shows a diagram of a wireless communications system.

Referring first to FIG. 1, a diagram illustrates an example of a wireless communication system 100 which may provide access to one or more wireless networks. The wireless communication system 100 may include one or more multimode access point (AP) 105 providing wireless local area network (WLAN) communications with one or more mobile devices 115 (i.e., wireless stations (STAs)). Multimode APs 105 may communicate with mobile devices 115 according to wireless protocols that, for example, adhere to the IEEE 802.11 family of standards. The wireless communication system 100 may also include cellular base stations 110 which may provide cellular communications with one or more of the mobile devices 115 and/or the multimode APs 105. While only two base stations 110-a and 110-b are illustrated, additional base stations may exist in various examples. Likewise, while only one mobile device 115 is illustrated, additional mobile devices may exist in various examples.

The multimode AP 105 may be distributed or deployed within a coverage area 135-a of base station 110-a and/or a coverage area 135-b of base station 110-b. The multimode AP 105 may associate and wirelessly communicate via communication links 125-a and/or 125-b with base stations 110-a and/or 110-b, respectively. The multimode AP 105 may be stationary or mobile. The multimode AP 105 may wirelessly communicate with the base stations 110 via one or more antennas. The multimode AP 105 may communicate with the base stations 110 via multiple carriers. The multimode AP 105 may provide communication coverage area 140 for a respective geographic area. In some embodiments, a multimode AP 105 may be referred to as a base station, a radio base station, a basic service set (BSS), a hotspot, a MiFi access point, a wireless fidelity (Wi-Fi) AP, an extended service set (ESS), or some other suitable terminology. The communication coverage area 140 for multimode AP 105 may be divided into sectors making up only a portion of the coverage area (not shown). The wireless communication system 100 may include APs of different types (e.g., metropolitan area, home network, etc.), with varying sizes of coverage areas and overlapping coverage areas for different technologies.

The mobile devices 115 may be dispersed throughout the communication coverage area 140. The mobile device 115 may be stationary or mobile. The mobile device 115 may associate and communicate using communication link 120 with the multimode AP 105. The mobile device 115 may associate and communicate with other base stations (not shown), i.e., base stations other than base stations 110-a and 110-b. In some examples, the mobile device 115 may be able to communicate with different types of access points via communication links 120, and/or with different base station(s) 110 via communication links 125. The mobile device 115 may be referred to as mobile stations (MSs), mobile devices, stations (STAs), access terminals (ATs), user equipment (UE), subscriber stations (SSs), or subscriber units. The mobile device 115 may include cellular phones and wireless communications devices, but may also include personal digital assistants (PDAs), other handheld devices, wearable devices, netbooks, notebook computers, tablet computers, etc.

The communication links 120 shown in the wireless communication system 100 may include uplinks (ULs) for uplink transmissions from a mobile device 115 to a multimode AP 105, and/or downlinks (DLs) for downlink transmissions, from the multimode AP 105 to the mobile device 115. Similarly, communication links 125-a and 125-b shown in the wireless communication system 100 may include uplinks (ULs) for uplink transmissions from a multimode AP 105 to a base station 110, and/or downlinks (DLs) for downlink transmissions, from a base station 110 to a multimode AP 105. The downlink transmissions may also be called forward link transmissions, while the uplink transmissions may also be called reverse link transmissions.

In some examples, base station 110-a and 110-b may be associated with different cellular communications network technologies. For example, base station 110-a may be configured to support packet-switched communications (e.g., an LTE configured base station) whereas base station 110-b may be a legacy base station configured to support circuit-switched communications (e.g., a code division multiple access (CDMA) base station). Accordingly, base station 110-a may provide services to multimode AP 105 that are the same as, or different from the services provided by base station 110-b. Communication link 125-a may be a cellular network communication link providing LTE-based communications whereas communication link 125-b may similarly be a cellular network communication link but providing a legacy technology.

As illustrated in FIG. 1, the multimode AP 105 may be configured to act as a wireless router that provides a Wi-Fi hotspot for the mobile device 115. The multimode AP 105 may connect to the base stations 110 via cellular communication links (e.g., communication links 125) to access one or more services, e.g., internet access, voice call services, application specific services, etc. The multimode AP 105 may make these services available to the mobile device 115 via a WLAN communication link (e.g., communication link 120). The mobile device 115 may receive information associated with features supported by the multimode AP 105, e.g., that voice call services are available, that internet access is available, etc. This information may, however, be generic in the sense that the mobile device 115 is unaware of the specific aspects of the services, e.g., the mobile device 115 may receive a beacon from the multimode AP 105 with an "Internet Connectivity" flag set to 1.

Accordingly, mobile device 115 desiring to place a VoWLAN call may attempt to access an IP Multimedia Service (IMS) core of an LTE network via the multimode AP 105. To begin a voice call, the mobile device 115 may start the IMS registration process based on receipt of an IMS Packet Data Network (PDN) attach response message (with IMS-VoPS=1). A loss of the LTE connection at the multimode AP 105 (e.g., when the multimode AP is handed over from an LTE base station to a non-LTE base station or when cellular service is lost at the multimode AP 105) may prevent the mobile device 115 from making voice calls over VoWLAN. The mobile device 115, however, may be unaware that the LTE connection has been lost. For example, the multimode AP 105 may hand over to a non-LTE base station that maintains internet service to the mobile device 115, but does not provide an IMS VoLTE service. Accordingly, because internet connectivity has not been lost, the mobile device 115 may believe that the LTE connection is still available and attempt to initiate a VoWLAN call session. Without access at the multimode AP 105 to an IMS that supports VoLTE, the call session may fail.

Aspects of the present disclosure relate to the multimode AP 105 notifying the availability of the IMS service to the mobile device 115. Generally, the multimode AP 105 may notify the IMS service availability by transmitting information to the mobile device 115 as a part of a WLAN poll or beacon, and/or by the mobile device 115 querying the multimode AP 105 for the IMS service status. Certain services (e.g., VoWLAN/VoLTE, enhanced Multimedia Broadcast Multicast Service (eMBMS), etc.) are dependent on a specific RAT being available to the multimode AP 105. Some aspects may provide for the multimode AP 105 to publish to the mobile device 115 a current RAT for the backhaul connection between the multimode AP 105 and a core network and the status of services available for this RAT. Accordingly, the VoWLAN client on the mobile device 115 can monitor the active RAT of the multimode AP 105 and the status of available IMS services from that RAT. Based on this monitoring, the mobile device may take action (e.g., initiate an SIP_INVITE message for a voice call) or refrain from taking action (e.g., refrain from initiating an SIP_INVITE message for the voice call). According to other aspects, for such services the mobile device 115 may query the multimode AP 105 to determine the status of IMS services before initiating an action that is dependent on the availability of the service (e.g., before sending a SIP_INVITE message for a voice call).

Figure 2:
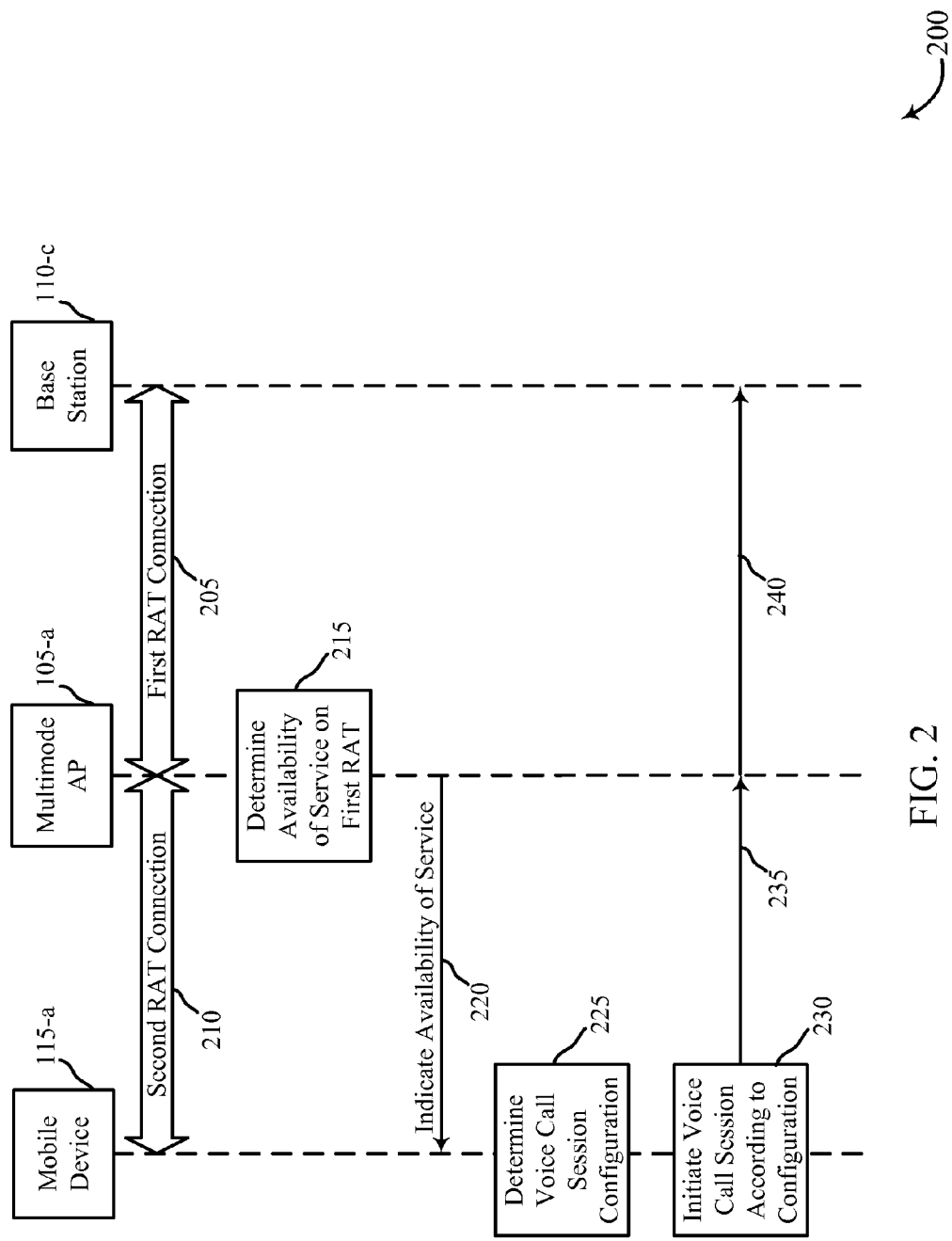
FIG. 2 shows a call flow diagram of an exemplary wireless communication system.

FIG. 2 is a call flow diagram 200 illustrating communication in a wireless communication system according to various embodiments. The diagram 200 may illustrate aspects of the wireless communication system 100 described with reference to FIG. 1. The diagram 200 includes a mobile device 115-*a*, a multimode AP 105-*a*, and a base station 110-*c*. Each of these may be examples of corresponding devices of the wireless communication system 100 of FIG. 1. Generally, the diagram 200 illustrates a multimode AP 105 indicating the availability of services to the mobile device 115-*a*.

The multimode AP 105-*a* may be associated and communicating with the base station 110-*c* via a first RAT connection 205 and, also, associated and communicating with the mobile device 115-*a* via a second RAT connection 210. In some examples, the first RAT is a cellular network communications technology (e.g., LTE, CDMA, WCDMA, GSM, etc.) and the second RAT is a WLAN connection. At 215, the multimode AP 105-*a* may determine whether a service is available on the first RAT, i.e., from the base station 110-*c*. The multimode AP 105-*a* may receive one or more information elements from the base station 110-*c* during initial connection, handover, and/or cell reselection to the base station 110-*c* and/or periodically indicative of the services the base station 110-*c* can provide. At 220, the multimode AP 105-*a* may send information to the mobile device 115-*a* to indicate which services are available from the base station 110-*c*. In some examples, the multimode AP 105-*a* may send information indicative of what RAT the base station 110-*c* is configured to support as well as what services are available from the base station 110-*c*.

The mobile device 115-*a* may determine a voice call session configuration 225 based at least in part on the services indicated available from the multimode AP 105-*a*. The mobile device 115-*a* may initiate the voice call session configured according to the indicated available services at 230 by sending a message 235 to the multimode AP 105-*a*, to be forwarded as message 240 to the base station 110-*c*. In some examples when the base station 110-*c* is an LTE base station and the multimode AP 105-*a* indicates a VoWLAN service is available, the mobile device 115-*a* may send a SIP_INVITE message through the multimode AP 105-*a* and the base station 110-*c* to an IMS core (i.e., tunnel the message) to begin the voice call. In other examples when the base station 110-*c* is a legacy base station and the multimode AP 105-*a* indicates a VoWLAN service is not available, the mobile device 115-*a* may transmit an origination message via an access channel to initiate the voice call session. The mobile device 115-*a* may send the origination message to the base station 110-*c* directly or to a different legacy base station (not shown). In other examples when the base station 110-*c* is a legacy base station and the multimode AP 105-*a* indicates a VoWLAN service is not available, the mobile device 115-*a* may delay initiating a voice call session until a VoWLAN service is available again.

Figure 3:
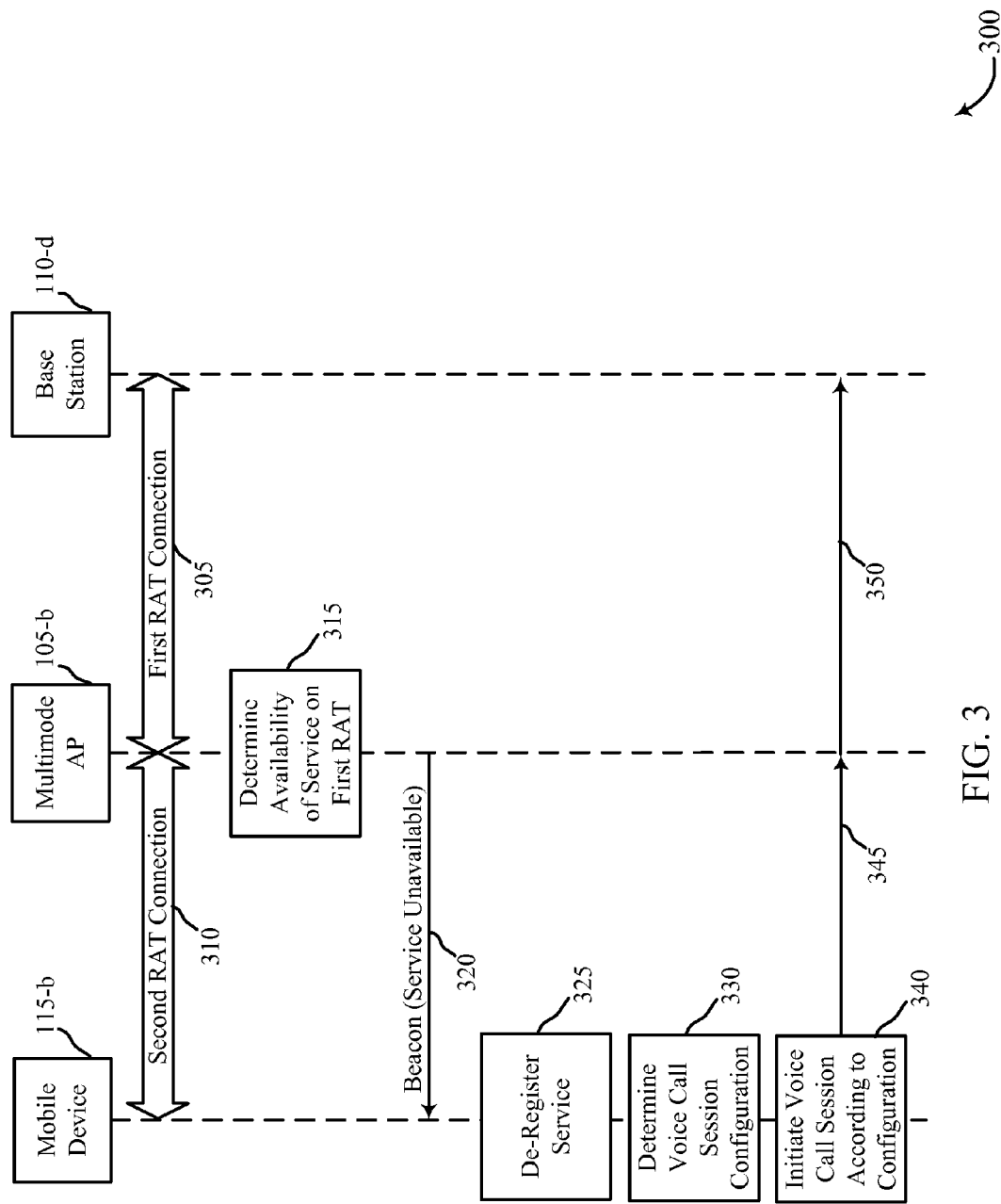
FIG. 3 shows a call flow diagram of another exemplary wireless communication system.

FIG. 3 is a call flow diagram 300 illustrating communications in a wireless communication system according to various embodiments. The diagram 300 may illustrate aspects of the wireless communication system 100 described with reference to FIG. 1. The diagram 300 includes a mobile device 115-*b*, a multimode AP 105-*b*, and a base station 110-*d*. Each of these may be examples of corresponding devices of the wireless communication system 100 of FIG. 1. Generally, the diagram 300 illustrates the multimode AP 105-*b* indicating the availability of a service to the mobile device 115-*b* utilizing a beacon and the mobile device 115-*b* de-registering from a service that is not available.

The multimode AP 105-*b* may be associated and communicating with the base station 110-*d* via a first RAT connection 305 and, also, associated and communicating with the mobile device 115-*b* via a second RAT connection 310. At 315, the multimode AP 105-*b* may determine whether a service is available on the first RAT, i.e., from the base station 110-*d*. At 320, the multimode AP 105-*b* may send a beacon to the mobile device 115-*b* including information indicative of which services are available (or unavailable as the case may be) from the base station 110-*d*. The multimode AP 105-*b* may send information indicative of what RAT the base station 110-*d* is configured to support as well as what services are available from the base station 110-*d*. In one example, a new information element (IE) field can be added to the beacon transmitted by the multimode AP 105-*b* that indicates the current active RAT associated with the base station 110-*d* and the status of the associated services. For example, the multimode AP 105-*b* may add a Backhaul_RAT IE to the beacon indicating LTE is available and a VoLTE flag IE set to TRUE when the LTE connection supports VoLTE service.

The mobile device 115-*b* may determine a voice call session configuration based on the services indicated available, or unavailable as the case may be, from the multimode AP 105-*b*. Continuing with the above example, when the mobile device 115-*b* receives the beacon from the multimode AP 105-*b* where Backhaul RAT=LTE and VoLTE=TRUE, the mobile device 115-*b* may send one or more messages to the multimode AP 105-*b* to initiate an IMS registration process, as discussed above with respect to FIG. 2. In the situation where the mobile device 115-*b* receives the beacon from the multimode AP 105-*b* where the Backhaul_RAT=WCDMA and the VoLTE=FALSE (assuming the multimode AP 105-*b* moves to a WCDMA connection when the LTE connection is lost), the mobile device 115-*b* may update the VoLTE status to not available and refrain from making the voice call, or instead, rely on a different RAT (i.e., something other than the multimode AP 105-*b*) to place a voice call. When the mobile device 115-*b* determines that VoLTE service is unavailable, the mobile device 115-*b* may locally de-register with the IMS core at 325.

The mobile device 115-*b* may initiate the voice call session configured according to the indicated available services at 330 by sending a message 345 to the multimode AP 105-*b*, to be forwarded as message 350 to the base station 110-*d*. In the example where the VoLTE service is unavailable, the mobile device 115-*b* may transmit an origination message via an access channel to initiate the voice call session with the base station 110-*d*.

Figure 4:
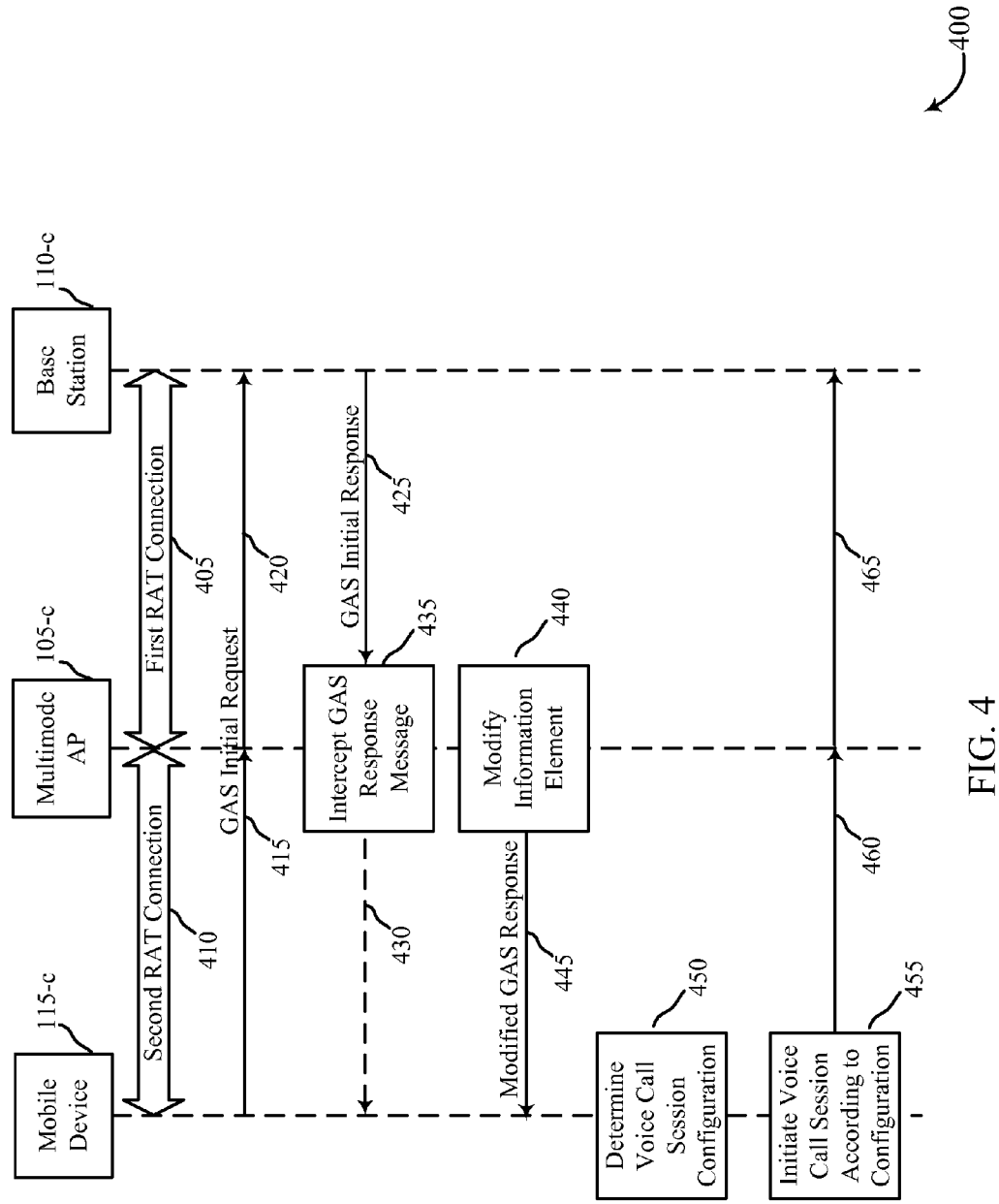
FIG. 4 shows a call flow diagram of another exemplary wireless communication system.

FIG. 4 is a call flow diagram 400 illustrating communication in a wireless communication system according to various embodiments. The diagram 400 may illustrate aspects of the wireless communication system 100 described with reference to FIG. 1. The diagram 400 includes a mobile device 115-*c*, a multimode AP 105-*c*, and a base station 110-*e*. Each of these may be examples of corresponding devices of the wireless communication system 100 of FIG. 1. Generally, the diagram 400 illustrates a polling mechanism to enable the multimode AP 105-*c* to determine and indicate the availability of services to the mobile device 115-*c*.

The multimode AP 105-*c* may be associated and communicating with the base station 110-*e* via a first RAT (e.g., LTE) connection 405 and, also, associated and communicating with the mobile device 115-*c* via a second RAT (e.g., WLAN) connection 410. At 415 and 420, the mobile device may send a General Advertisement Service (GAS) Initial Request message (e.g., Access Network Query Protocol (ANQP), Connection Capability IE, etc.) to an "Advertise Server" located in the operator's core network (not shown), i.e., through the multimode AP 105-*c* and the base station 110-*e* to the Advertise Server. The Advertise Server may respond with Connection Capability IE in a GAS Initial Response (e.g., "Protocol/Port 6/5060 (VoIP) OPEN/CLOSED) at 425. According to current designs, the multimode AP 105-*c* acts as a pass-through between the mobile device 115-*c* and the Advertise Server and simply passes the GAS Initial Response on to the client at 430.

According to aspects of the present disclosure though, the multimode AP 105-*c* may intercept the GAS Initial Response at 435 and read the GAS Initial Response message and, if necessary, modify an IE at 440 based on the availability of services. For example, the multimode AP 105-*c* may overwrite the Connection Capability IE with information indicative of the VoLTE status/capability. In another example, when the multimode AP 105-*c* receives information indicating that the VoLTE service is available via NAS signaling (e.g., PDN Attach Response), the multimode AP 105-*c* may overwrite the IE to read "Protocol/Port 6/5060 (VoIP) OPEN." When the LTE connection is lost and, hence, the VoLTE service is unavailable, the multimode AP 105-*c* may overwrite the IE to read "Protocol/Port 6/5060 (VoIP) CLOSED." The multimode AP 105-*c* may send the modified GAS Initial Response to the mobile device 115-*c* at 445 to indicate the availability of the services.

The mobile device 115-*c* may determine a voice call session configuration 450 based on the services indicated available from the multimode AP 105-*a* via the modified GAS Initial Response message. The mobile device 115-*c* may initiate the voice call session configured according to the indicated available services at 455 by sending a message 460 to the multimode AP 105-*c*, to be forwarded as message 465 to the base station 110-*e*.

Figure 5A:
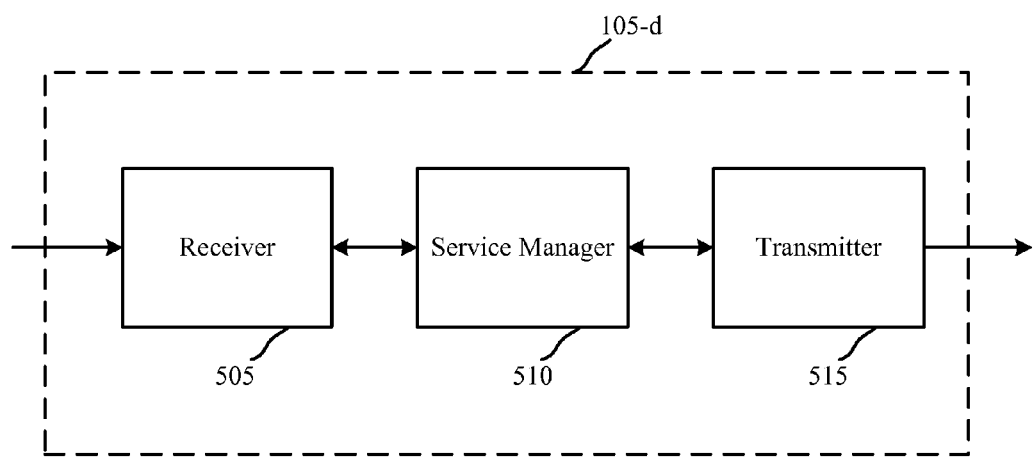
FIGS. 5A and 5B show block diagrams of exemplary multimode access points.

FIG. 5A shows a block diagram 500-*a* of an apparatus 105-*d* for wireless communication, in accordance with various aspects of the present disclosure. In some embodiments, the apparatus 105-*d* may be an example of aspects of the multimode AP 105 described with reference to FIG. 1, 2, 3 or 4.

The apparatus 105-*d* may be an example of a multimode AP 105 configured to determine what services are available from a base station on a first RAT and indicate the availability of the services to a mobile device 115 via a second RAT. The apparatus 105-*d* may include a receiver 505, a service manager 510, and/or a transmitter 515. Each of these components may be in communication with each other.

The components of the apparatus 105-*d* may, individually or collectively, be implemented using an ASIC adapted to perform some or all of the applicable functions in hardware. Alternatively, the functions may be performed by other processing units (or cores), on an integrated circuit. The apparatus 105-*d* may be a processor. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors.

In some embodiments, the receiver 505 may be or include one or more RF receivers such as a WLAN receiver. The receiver 505 may also include other receivers, such as a Wi-Fi receiver and/or a wireless wide area network (WWAN) receiver (e.g., a cellular receiver). The receiver 505 may be used to receive various types of data and/or control signals (i.e., transmissions) over communication links (e.g., physical channels) of a wireless communication system such as the wireless communication system 100 described with reference to FIG. 1. For example, the receiver 505 may be used to receive one or more messages exchanged with a base station to determine the RAT being implemented by the base station and the services associated with the base station. In another example, the receiver 505 may be used to receive one or more messages exchanged with a mobile device to initiate a voice call session, for example.

In some embodiments, the transmitter 515 may be or include an RF transmitter such as a WLAN transmitter. The transmitter 515 may also include other transmitters, such as a Wi-Fi transmitter and/or a WWAN transmitter (e.g., a cellular transmitter). The transmitter 515 may be used to transmit various types of data and/or control signals (i.e., transmissions) over communication links (e.g., physical channels) of a wireless communication system such as the wireless communication system 100 described with reference to FIG. 1. For example, the transmitter 515 may be used to transmit to a mobile device information associated with an indication of what services are available from a base station. The transmitter 515 may be used to transmit to a base station information associated with a voice call session, for example. In some embodiments, the receiver 505 may receive information from a base station on a first RAT (e.g., LTE) and the transmitter 515 may transmit to the mobile device on a second RAT (e.g., WLAN), or vice versa.

In some embodiments, the service manager 510 may be an example of a module that manages the functions described with reference to FIG. 1, 2, 3 or 4. In some examples, the service manager 510 may be used to manage determining an available service from a base station and informing a mobile device of the service availability. The service manager 510 may be configured to determine what services are available from a base station on a first RAT (e.g., a VoWLAN service on an LTE base station). The service manager 510 may determine whether the service is available (or unavailable) and send an indication of what services are available (or unavailable) to a mobile device on a second RAT. The service manager 510 may send an indication of available services via one or more information elements (IEs) of a beacon, in response to a poll from the mobile device, etc.

Figure 5B:
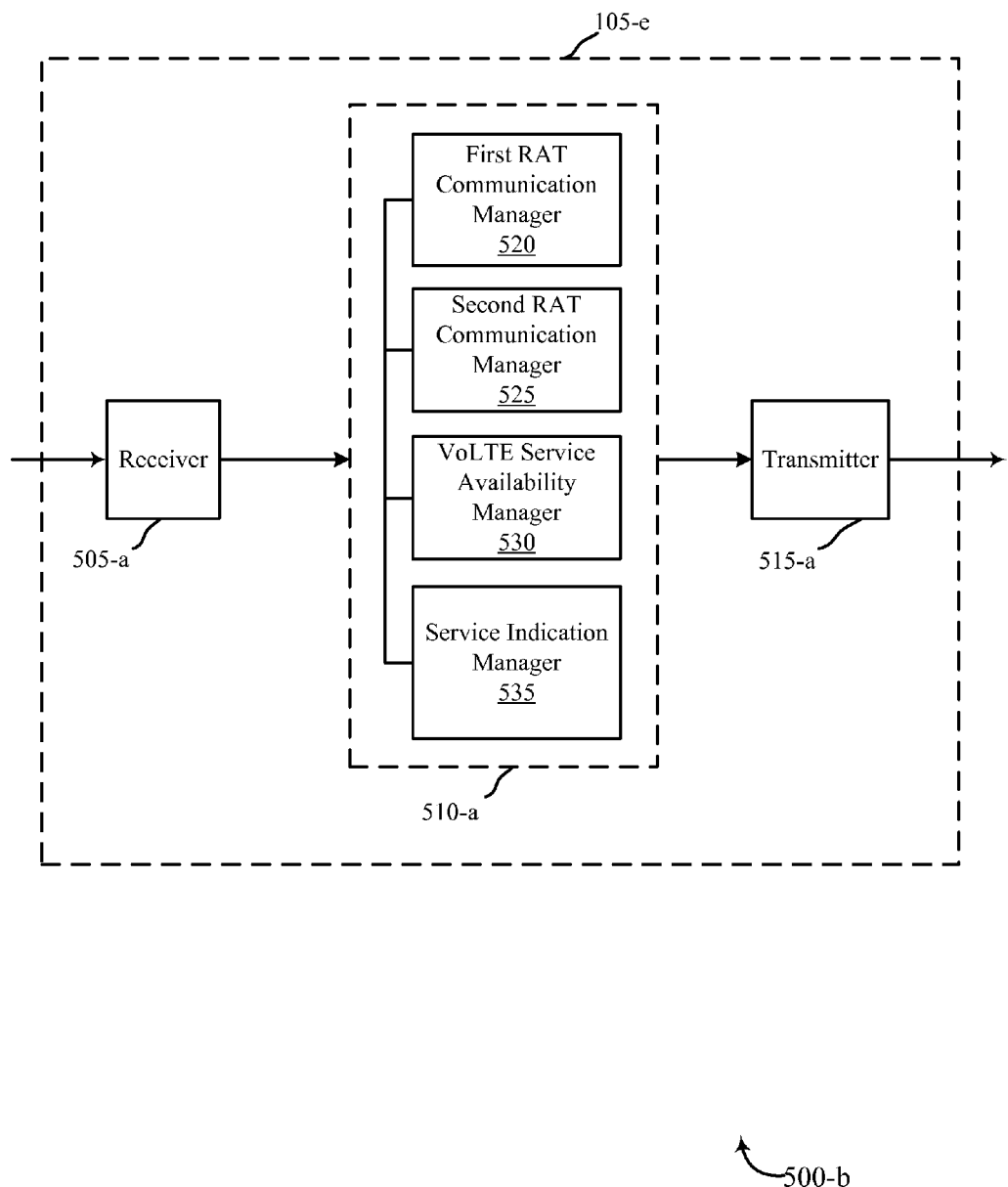

FIG. 5B shows a block diagram 500-*b* of an apparatus 105-*e* for wireless communication, in accordance with various aspects of the present disclosure. In some embodiments, the apparatus 105-*e* may be an example of aspects of the multimode AP 105 described with reference to FIG. 1, 2, 3 or 4. The apparatus 105-*e* may be an example of a multimode AP 105 configured to determine whether a service is available from a base station on a first RAT and send an indication of the available services to a mobile device on a second RAT.

The apparatus 105-*e* may include a receiver 505-*a*, a service manager 510-*a*, and/or a transmitter 515-*a*. Each of these components may be in communication with each other. The components of the apparatus 105-*e* may, individually or collectively, be implemented using an ASIC adapted to perform some or all of the applicable functions in hardware. Alternatively, the functions may be performed by other processing units (or cores), on an integrated circuit. The apparatus 105-*e* may also be a processor programmed to perform the applicable functions. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors.

In some embodiments, the receiver 505-*a* may be or include one or more RF receivers such as a WLAN receiver. The receiver 505-*a* may also include other receivers, such as a Wi-Fi receiver and/or a wireless wide area network (WWAN) receiver (e.g., a cellular receiver). The receiver 505-*a* may be used to receive various types of data and/or control signals (i.e., transmissions) over communication links (e.g., physical channels) of a wireless communication system such as the wireless communication system 100 described with reference to FIG. 1. For example, the receiver 505-*a* may be used to receive one or more messages exchanged with a base station to determine the RAT being implemented by the base station and the services associated with the base station. In another example, the receiver 505-*a* may be used to receive one or more messages exchanged with a mobile device to initiate a voice call session, for example.

In some embodiments, the transmitter 515-*a* may be or include an RF transmitter such as a WLAN transmitter. The transmitter 515-*a* may also include other transmitters, such as a Wi-Fi transmitter and/or a WWAN transmitter (e.g., a cellular transmitter). The transmitter 515-*a* may be used to transmit various types of data and/or control signals (i.e., transmissions) over communication links (e.g., physical channels) of a wireless communication system such as the wireless communication system 100 described with reference to FIG. 1. For example, the transmitter 515-*a* may be used to transmit to a mobile device information associated with an indication of what services are available from a base station. The transmitter 515-*a* may be used to transmit to a base station information associated with a voice call session, for example. In some embodiments, the receiver 505-*a* may receive information from a base station on a first RAT (e.g., LTE) and the transmitter 515-*a* may transmit to the mobile device on a second RAT (e.g., WLAN), or vice versa.

In some embodiments, the service manager 510-*a* may be an example of a module that manages the functions described with reference to FIG. 1, 2, 3 or 4. The service manager 510-*a* may include a first RAT Communication Manager 520, a second RAT communication manager 525, a VoLTE service availability manager 530, and a service indication manager 535. Generally, the service manager 510-*a* may be used to manage a determination of availability of services and an indication of such available services.

In some examples, the first RAT communication manager 520 may be configured to manage communications with a base station via a first RAT, e.g., LTE, WCDMA, etc. The first RAT communication manager 520 may receive signals or information from the base station via the receiver 505-*a* and transmit signals or information to the base station via the transmitter 515-*a*. The second RAT communication manager 525 may be configured to manage communications with a mobile device via a second RAT, e.g., WLAN, Wi-Fi, etc. The second RAT communication manager 525 may receive signals or information from the mobile device via the receiver 505-*a* and transmit signals or information to the device via the transmitter 515-*a*.

In some examples, the VoLTE service availability manager 530 may be configured to determine whether a VoLTE service is available from the base station on the first RAT. The VoLTE service availability manager 530 may communicate with the first RAT communication manager 520 to determine what RAT is being utilized by the base station and which services are available from the base station on the first RAT. The VoLTE service availability manager 530 may determine, for example, that the base station is configured to support a LTE RAT and that a VoLTE service is available from the LTE base station.

In some examples, the service indication manager 535 may be configured to indicate the available services to a mobile device. The service indication manager 535 may communicate with the VoLTE service availability manager 530 to receive information indicative of the available services. The service indication manager 535 may communicate with the transmitter 515-*a* to send an indication to the mobile device of the available services. In some embodiments, the service indication manager 535 may send the indication as one or more information elements in a beacon transmitted to the mobile device. That is, the service indication manager 535 may cooperate with the second RAT communication manager 525 and/or the transmitter 515-*a* to encode a beacon with information indicative of the available service, e.g., a first information element indicative of the first RAT and a second information element indicative of the service availability on the first RAT. In other embodiments, the service indication manager 535 may cooperate with the first RAT communication manager 520 and/or the VoLTE service availability manager 530 to intercept a message from a network entity (e.g., an IMS core) directed to the mobile device. The service indication manager 535 may read one or more information elements in the message and, if necessary, modify an information element to indicate the availability of the service on the first RAT. The service indication manager 535 may send the modified message including the information element indicative of the available services to the mobile device via the second RAT.

Figure 6A:
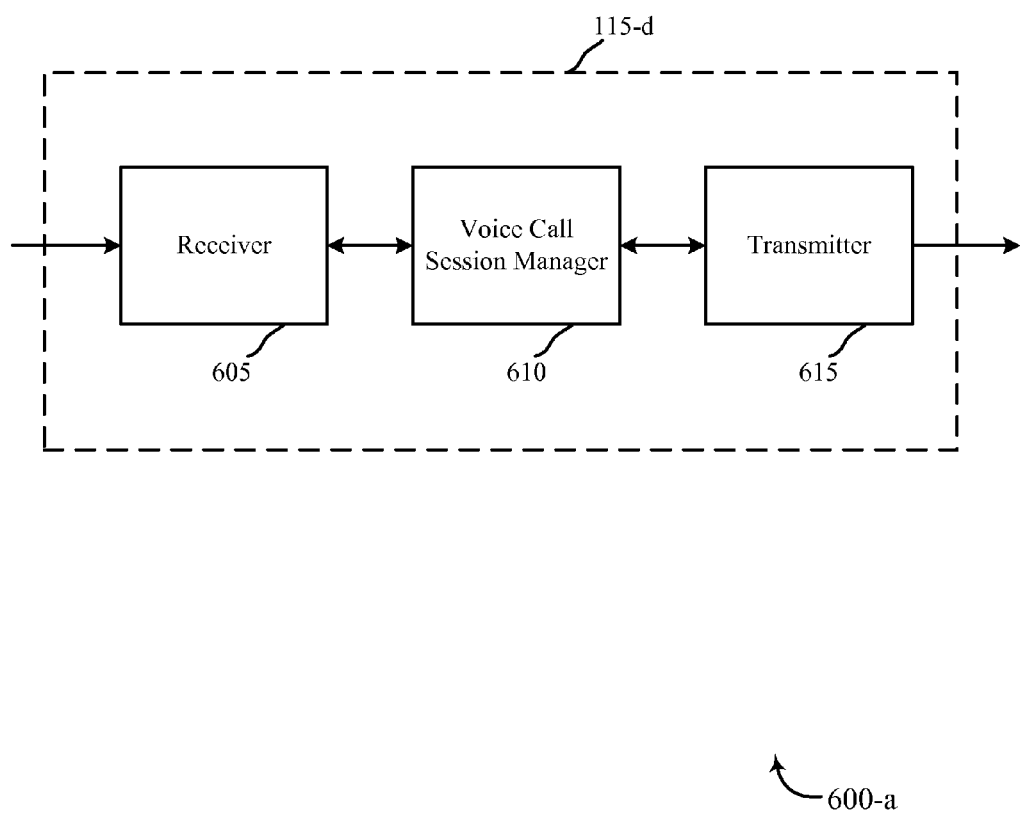
FIGS. 6A and 6B show block diagrams of exemplary mobile devices.

FIG. 6A shows a block diagram 600-*a* of an apparatus 115-*d* for wireless communication, in accordance with various aspects of the present disclosure. In some embodiments, the apparatus 115-d may be an example of aspects of the mobile device 115 described with reference to FIG. 1, 2, 3 or 4.

The apparatus 115-d may be an example of a mobile device 115 configured to receive, via a second RAT, an indication of what services are available from a base station on a first RAT and configure a voice call session based at least in part on the received indication. The apparatus 115-d may include a receiver 605, a voice call session manager 610, and/or a transmitter 615. Each of these components may be in communication with each other.

The components of the apparatus 115-d may, individually or collectively, be implemented using an ASIC adapted to perform some or all of the applicable functions in hardware. Alternatively, the functions may be performed by other processing units (or cores), on an integrated circuit. The apparatus 115-d may be a processor. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors.

In some embodiments, the receiver 605 may be or include one or more RF receivers such as a WLAN receiver. The receiver 605 may also include other receivers, such as a Wi-Fi receiver. The receiver 605 may be used to receive various types of data and/or control signals (i.e., transmissions) over communication links (e.g., physical channels) of a wireless communication system such as the wireless communication system 100 described with reference to FIG. 1. For example, the receiver 605 may be used to receive one or more messages exchanged with a multimode AP indicating what services are available from a base station.

In some embodiments, the transmitter 615 may be or include an RF transmitter such as a WLAN transmitter. The transmitter 615 may also include other transmitters, such as a Wi-Fi transmitter. The transmitter 615 may be used to transmit various types of data and/or control signals (i.e., transmissions) over communication links (e.g., physical channels) of a wireless communication system such as the wireless communication system 100 described with reference to FIG. 1. For example, the transmitter 615 may be used to transmit one or messages associated with a voice call session configured based at least in part on what services are available from a base station.

In some embodiments, the voice call session manager 610 may be an example of a module that manages the functions described with reference to FIG. 1, 2, 3 or 4. In some examples, the voice call session manager 610 may be used to manage receiving an indication of available service from a multimode AP and configuring a voice call session accordingly. The voice call session manager 610 may be configured to receive, from a multimode AP on a second RAT, what services are available from a base station on a first RAT (e.g., a VoLTE service from a LTE base station). The voice call session manager 610 may configure a voice call session dependent at least in part on what services are available (e.g., a VoWLAN voice call session that relies on VoLTE service at the multimode AP). The voice call session manager 610 may initiate the voice call session according to the configuration.

Figure 6B:
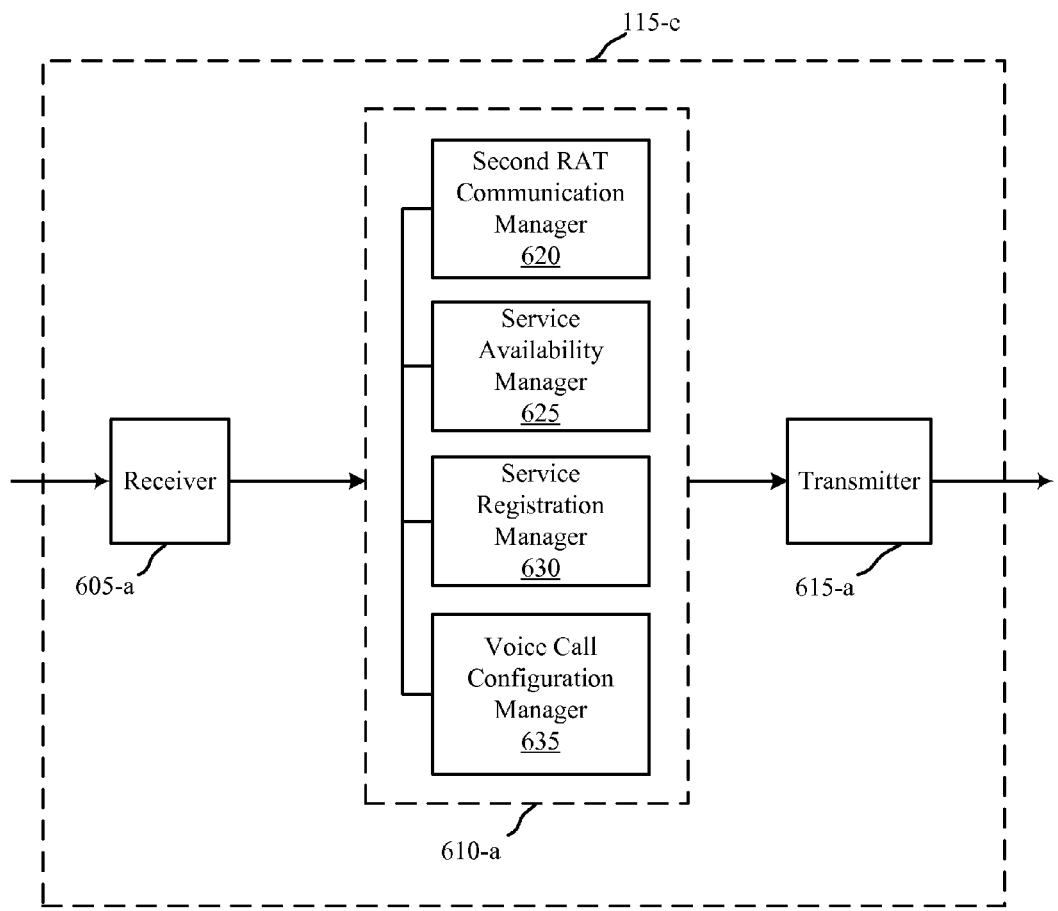

FIG. 6B shows a block diagram 600-b of an apparatus 115-e for wireless communication, in accordance with various aspects of the present disclosure. In some embodiments, the apparatus 115-e may be an example of aspects of the mobile device 115 described with reference to FIG. 1, 2, 3 or 4. The apparatus 115-e may be an example of a mobile device 115 configured to receive, via a second RAT, an indication of whether a service is available from a base station on a first RAT and configure a voice call session accordingly.

The apparatus 115-e may include a receiver 605-a, a voice call session manager 610-a, and/or a transmitter 615-a. Each of these components may be in communication with each other. The components of the apparatus 115-e may, individually or collectively, be implemented using an ASIC adapted to perform some or all of the applicable functions in hardware. Alternatively, the functions may be performed by other processing units (or cores), on an integrated circuit. The apparatus 115-e may also be a processor programmed to perform the applicable functions. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by general or application-specific processors.

In some embodiments, the receiver 605-a may be or include one or more RF receivers such as a WLAN receiver. The receiver 605-a may also include other receivers, such as a Wi-Fi receiver. The receiver 605 may be used to receive various types of data and/or control signals (i.e., transmissions) over communication links (e.g., physical channels) of a wireless communication system such as the wireless communication system 100 described with reference to FIG. 1. For example, the receiver 605-a may be used to receive one or more messages exchanged with a multimode AP indicating what services are available from a base station.

In some embodiments, the transmitter 615-a may be or include an RF transmitter such as a WLAN transmitter. The transmitter 615-a may also include other transmitters, such as a Wi-Fi transmitter. The transmitter 615-a may be used to transmit various types of data and/or control signals (i.e., transmissions) over communication links (e.g., physical channels) of a wireless communication system such as the wireless communication system 100 described with reference to FIG. 1. For example, the transmitter 615-a may be used to transmit one or messages associated with a voice call session configured based at least in part on what services are available from a base station.

In some embodiments, the voice call session manager 610-a may be an example of a module that manages the functions described with reference to FIG. 1, 2, 3 or 4. The voice call session manager 610-a may include a second RAT communication manager 620, a service availability manager 625, a service registration manager 630, and a voice call configuration manager 635. Generally, the voice call session manager 610-a may be used to configure a voice call session based on a received indication of available services.

The second RAT communication manager 620 may be configured to manage communications with a multimode AP via a second RAT, e.g., WLAN, Wi-Fi, etc. The second RAT communication manager 620 may receive signals or information from the multimode AP via the receiver 605-a and transmit signals or information to the multimode AP via the transmitter 615-a.

In some examples, the service availability manager 625 may be configured to receive an indication of whether a VoLTE service is available from the base station on the first RAT. The service availability manager 625 may communicate with the second RAT communication manager 620 to receive one or more messages from the multimode AP via a second RAT including one or more information elements indicative of what RAT is being utilized by the base station and which services are available from the base station on the first RAT. The service availability manager 625 may determine that the base station is configured to support a LTE RAT and that a VoLTE service is available from the LTE base station by reading one or more information elements included in a beacon and/or a GAS Initial Response message, for example.

In some examples, the service registration manager 630 may be configured to manage a registration and/or de-registration with a service on the base station. For example, the service registration manager 630 may communicate with the service availability manager 625 to determine that the base station is configured to support a LTE RAT and that a VoLTE service is available from the LTE base station. The service registration manager 630 may communicate with the second RAT communication manager 620, the receiver 605-a, and/or the transmitter 615-a to initiate or maintain a registration with an IMS core accordingly. In another example, the service registration manager 630 may communicate with the service availability manager 625 to determine that the base station is configured to support a WCDMA RAT, for example, and that a VoLTE service is unavailable from the base station. The service registration manager 630 may communicate with the second RAT communication manager 620, the receiver 605-a, and/or the transmitter 615-a to exchange messages with the IMS core to de-register the apparatus 115-e.

In some examples, the voice call configuration manager 635 may be configured to manage the determination of a configuration for a voice call session based at least in part on the available services. For example, the voice call configuration manager 635 may communicate with the service availability manager 625 and/or the service registration manager 630 to receive information indicative of what services are available from a base station and/or with what services the apparatus 115-e is currently registered. The voice call configuration manager 635 may configured a voice call session according to the available services, e.g., a VoLTE voice call session when the base station is configured to support a LTE RAT and that a VoLTE service is available.

Figure 7:
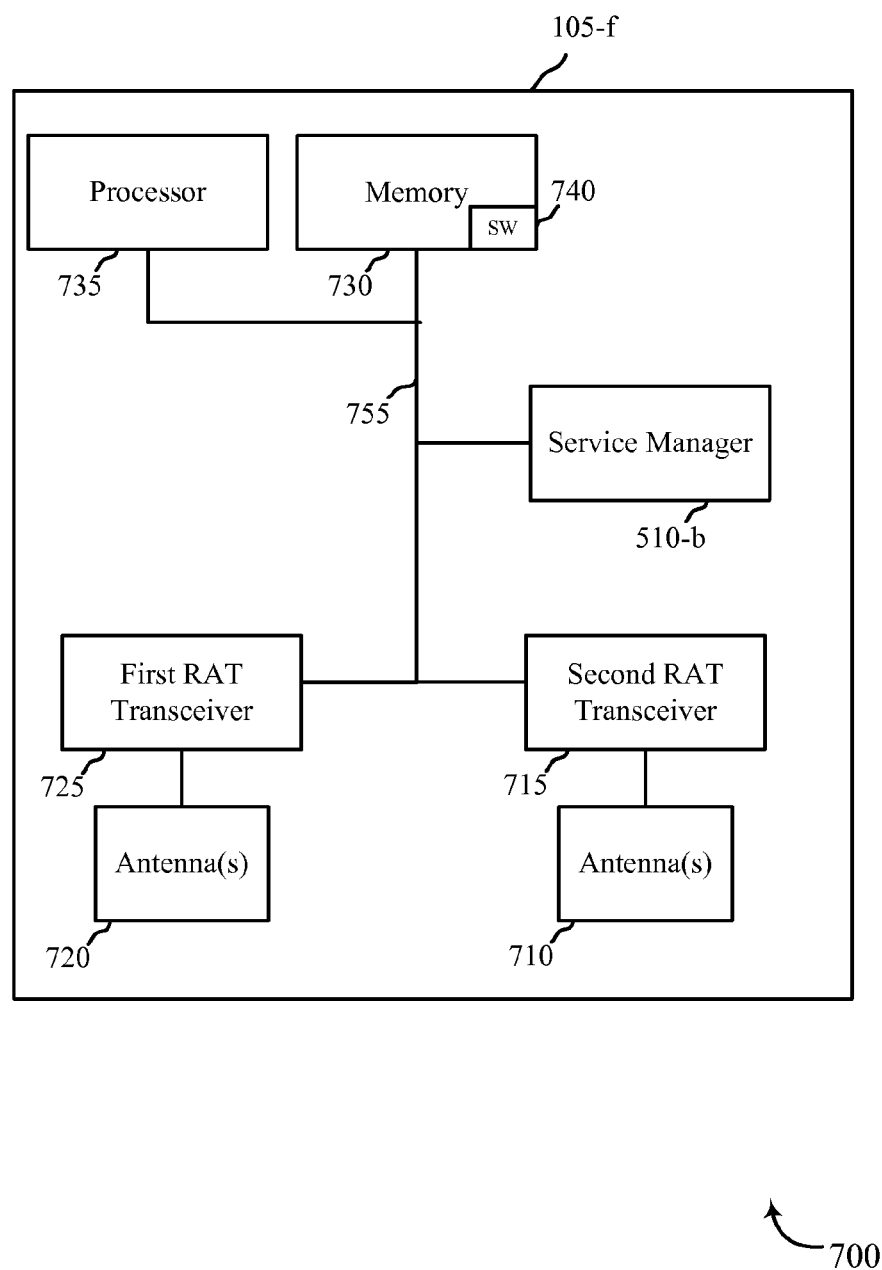
FIG. 7 shows a block diagram of a device configured for communication in a wireless communication system.

FIG. 7 shows a block diagram 700 of an apparatus 105-f configured for wireless communication, in accordance with various aspects of the present disclosure. The apparatus 105-f may have various configurations and may be part of a computer (e.g., a laptop computer, netbook computer, tablet computer, etc.), a cellular telephone, a personal digital assistant (PDA), a digital video recorder (DVR), an internet appliance, a gaming console, an e-reader, etc. The apparatus 105-f may in some cases have an internal power supply (not shown), such as a small battery, to facilitate mobile operation. In some embodiments, the apparatus 105-f may be an example of aspects of the multimode AP 105 described with reference to FIG. 1, 2, 3 4, 5A, or 5B. The apparatus 105-f may be configured to implement the features and functions described with reference to FIG. 1, 2, 3, 4, 5 or 6. The apparatus 105-f may be configured to communicate with mobile device 115 and/or with base stations 110 described with reference to FIG. 1, 2, 3 4, 6A, or 6B.

The apparatus 105-f may include a processor 735, a memory 730 (including software code 740), a first RAT transceiver 725 communicating via antenna(s) 720, a second RAT transceiver 715 communicating via antenna(s) 710, and/or a service manager 510-b. Each of these components may be in communication with each other, directly or indirectly, over a bus 755.

The first RAT transceiver 725, in conjunction with antenna(s) 720, may facilitate wireless communication with base stations 110. Wireless communication with a base station via the first RAT, as described above, may be managed using the service manager 510-b. The second RAT transceiver 715, in conjunction with antenna(s) 710, may facilitate wireless communication with mobile devices 115 and/or other apparatuses. Wireless communication with a mobile device 115 over the second RAT, as described above, may be managed using the service manager 510-b.

The processor 735 may include an intelligent hardware device, e.g., a central processing unit (CPU), a microcontroller, an ASIC, etc. The processor 735 may process information received through the transceivers 725 and/or 715 and/or process information to be sent to the transceivers 725 and/or 715 for transmission through the antennas 720 and 710, respectively. The processor 735 may handle, alone or in connection with the service manager 510-b, various aspects of communicating over a wireless and/or wireline communication system.

The memory 730 may include RAM and/or ROM. The memory 730 may store computer-readable, computer-executable software (SW) code 740 containing instructions that are configured to, when executed, cause the processor 735 to perform various functions described herein for communicating over a wireless communication system. Alternatively, the software code 740 may not be directly executable by the processor 735 but be configured to cause the apparatus 105-f (e.g., when compiled and executed) to perform various of the functions described herein.

The service manager 510-b may be an example of aspects of the service manager 510 described with reference to FIG. 5A or 5B. The service manager 510-b may be used to manage the wireless connections of the apparatus 105-f as they relate to determining a service available from a base station and sending an indication of the available services to a mobile device. In some embodiments, the service manager 510-b, or portions of same, may include a processor, and/or some or all of the functionality of the service manager 510-b may be performed by the processor 735 and/or in connection with the processor 735.

Figure 8:
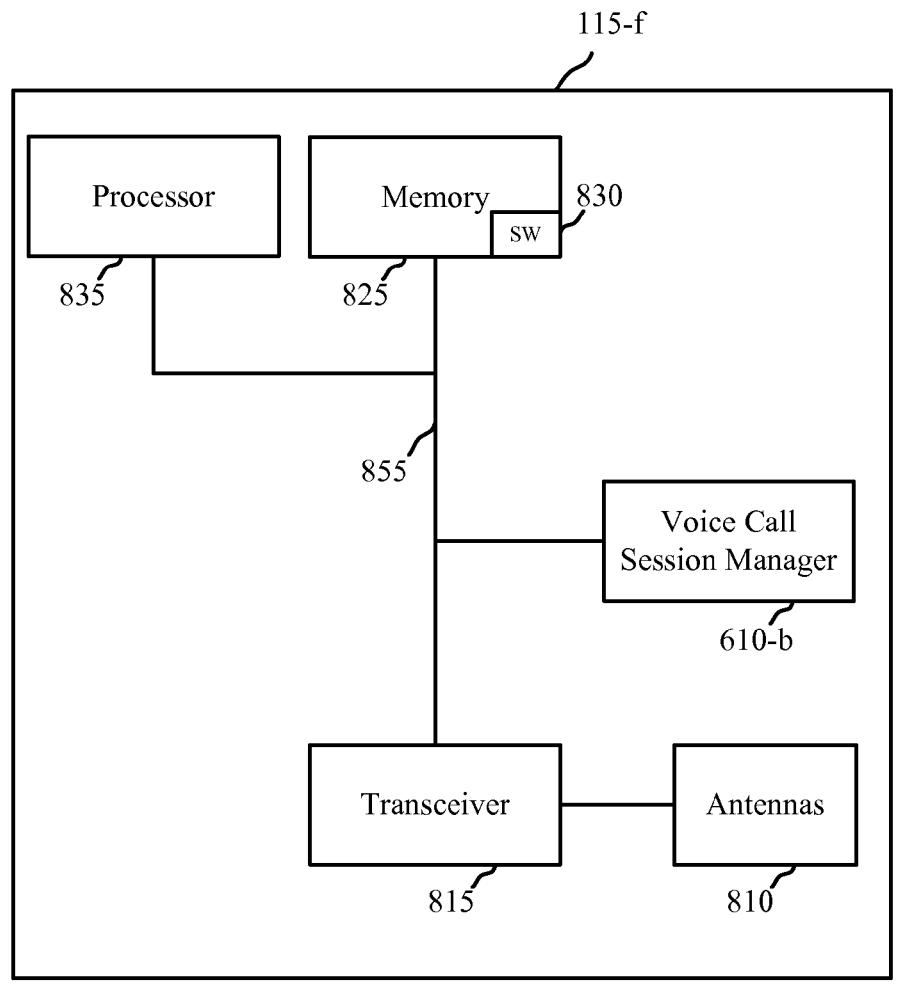
FIG. 8 shows a block diagram of another device configured for communication in a wireless communication system.

FIG. 8 shows a block diagram 800 of an apparatus 115-f configured for wireless communication, in accordance with various aspects of the present disclosure. The apparatus 115-f may have various configurations and may be or be part of a computer (e.g., a laptop computer, netbook computer, tablet computer, etc.), a cellular telephone, a personal digital assistant (PDA), a digital video recorder (DVR), an internet appliance, a gaming console, an e-reader, etc. The apparatus 115-f may in some cases have an internal power supply (not shown), such as a small battery, to facilitate mobile operation. In some embodiments, the apparatus 115-f may be an example of aspects of the mobile devices 115 described with reference to FIG. 1, 2, 3 4, 6A, or 6B. The apparatus 115-f may be configured to implement the features and functions described with reference to FIG. 1, 2, 3, 4, 5 or 6. The apparatus 115-f may be configured to communicate with multimode AP 105 described with reference to FIG. 1, 2, 3 4, 6A, or 6B.

The apparatus 115-f may include a processor 835, a memory 825 (including software code 830), a transceiver 815 communicating via antenna(s) 810, and/or a voice call session manager 610-*b*. Each of these components may be in communication with each other, directly or indirectly, over a bus 855.

The transceiver 815, in conjunction with antenna(s) 810, may facilitate wireless communication with multimode AP 105. Wireless communication with a multimode AP 105 may be via a second RAT, as described above, and may be managed using the voice call session manager 610-*b*.

The processor 835 may include an intelligent hardware device, e.g., a central processing unit (CPU), a microcontroller, an ASIC, etc. The processor 835 may process information received through the transceiver(s) 815 and/or process information to be sent to the transceiver(s) 815 for transmission through the antennas 810. The processor 835 may handle, alone or in connection with the voice call session manager 610-*b*, various aspects of communicating over a wireless and/or wireline communication system.

The memory 825 may include RAM and/or ROM. The memory 825 may store computer-readable, computer-executable software (SW) code 830 containing instructions that are configured to, when executed, cause the processor 835 to perform various functions described herein for communicating over a wireless communication system. Alternatively, the software code 830 may not be directly executable by the processor 835 but be configured to cause the apparatus 115-*f* (e.g., when compiled and executed) to perform various of the functions described herein.

The voice call session manager 610-*b* may be an example of aspects of the voice call session manager 610 described with reference to FIG. 6A or 6B. The voice call session manager 610-*b* may be used to manage the wireless connections of the apparatus 115-*f* as they relate to receiving an indication of a service available from a base station and configuring a voice call session based at least in part on the available services In some embodiments, the voice call session manager 610-*b*, or portions of same, may include a processor, and/or some or all of the functionality of the voice call session manager 610-*b* may be performed by the processor 835 and/or in connection with the processor 835.

Figure 9:
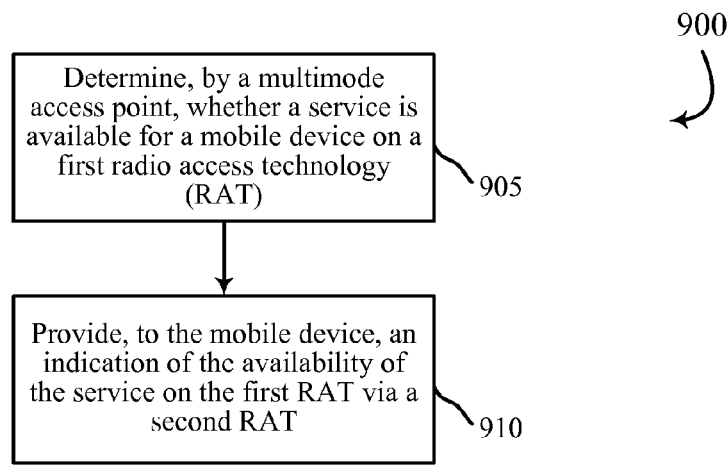
FIG. 9 shows a flowchart diagram of an illustrative method for wireless communications.

FIG. 9 shows a flowchart diagram of an illustrative method 900 for wireless communications according to aspects of the principles described above. The method 900 may be implemented by a multimode AP 105 described above with reference to FIG. 1, 2, 3, 4, 5A or 5B and/or an apparatus 105 of FIG. 7. In some examples, a multimode AP 105 or an apparatus 105 may execute sets of codes to control the functional elements of the multimode AP to perform the functions described below.

At block 905, the method 900 may determine, by a multimode AP 105, whether a service is available for a mobile device on a first radio access technology (RAT). For example, the determination may be performed at 215, 315, 435-440, as described above with reference to FIG. 2, 3, or 4, respectively.

At block 910, the method 900 may include provide, to the mobile device, an indication of the availability of the service on the first RAT via a second RAT. For example, the indication of the available service may be performed at 220, 320, 445, as described above with reference to FIG. 2, 3, or 4, respectively.

In some embodiments, the operations at blocks 905 or 910 may be performed by service manager 510 described with reference to FIG. 5A, 5B or 7. Nevertheless, it should be noted that the method 900 is just one implementation and that the operations of the method 900 may be rearranged or otherwise modified such that other implementations are possible.

Figure 10:
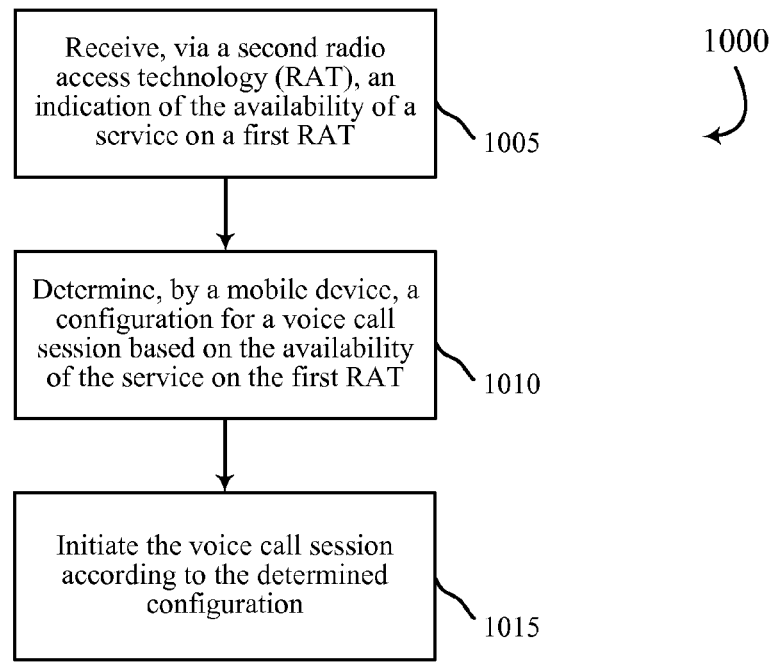
FIG. 10 shows a flowchart diagram of an illustrative method for wireless communications.

FIG. 10 shows a flowchart diagram of an illustrative method 1000 for wireless communications according to aspects of the principles described above. The method 1000 may be implemented by a mobile device 115 described above with reference to FIG. 1, 2, 3, 4, 5A or 5B and/or an apparatus 115 of FIG. 8. In some examples, a mobile device 115 or an apparatus 115 may execute sets of codes to control the functional elements of the multimode AP to perform the functions described below.

At block 1005, the method 1000 may receive, via a second RAT, an indication of the availability of a service on a first RAT. For example, the received indication may be performed at 220, 320, 445, as described above with reference to FIG. 2, 3, or 4, respectively.

At block 1010, the method 1000 may include determine, by a mobile device, a configuration for a voice call session based on the availability of the service on the first RAT. For example, the determination may be performed at 225, 325-330, 450, as described above with reference to FIG. 2, 3, or 4, respectively.

At block 1015, the method 1000 may include initiate the voice call session according to the determined configuration. For example, the initiation may be performed at 230-240, 340-350, 455-465, as described above with reference to FIG. 2, 3, or 4, respectively.

In some embodiments, the operations at blocks 1005, 1010, or 1015 may be performed by the voice call session manager 610 described with reference to FIG. 6A, 6B or 8. Nevertheless, it should be noted that the method 1000 is just one implementation and that the operations of the method 1000 may be rearranged or otherwise modified such that other implementations are possible.

Figure 11:
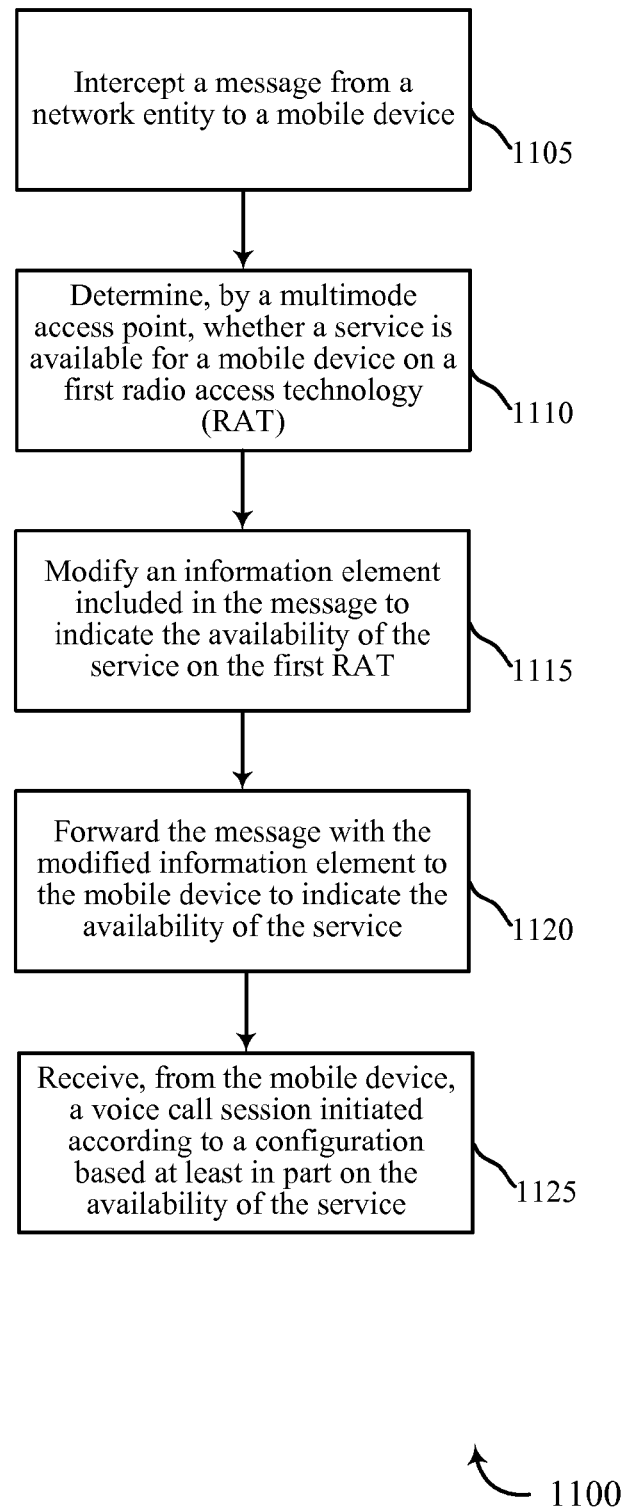
FIG. 11 shows a flowchart diagram of an illustrative method for wireless communications.

FIG. 11 shows a flowchart diagram of an illustrative method 1100 for wireless communications according to aspects of the principles described above. The method 1100 may be implemented by a multimode AP 105 described above with reference to FIG. 1, 2, 3, 4, 5A or 5B and/or an apparatus 105 of FIG. 7. In some examples, a multimode AP 105 or an apparatus 105 may execute sets of codes to control the functional elements of the multimode AP to perform the functions described below.

At block 1105, the method 1100 may intercept a message from a network entity to a mobile device. For example, the interception may be performed at 215, 315, 425-430, as described above with reference to FIG. 2, 3, or 4, respectively.

At block 1110, the method 1100 may determine, by a multimode AP, whether a service is available for a mobile device on a first radio access technology (RAT). For example, the determination may be performed at 215, 315, 435-440, as described above with reference to FIG. 2, 3, or 4, respectively.

At block 1115, the method 1100 may include modifying an information element included in the message to indicate the availability of the service on the first RAT. For example, the modification of the information element may be performed at 215, 315, 440, as described above with reference to FIG. 2, 3, or 4, respectively.

At block 1120, the method 1100 may include forward the message with the modified information element to the mobile device to indicate the availability of the service. For example, the forwarding may be performed at 220, 320, 445, as described above with reference to FIG. 2, 3, or 4, respectively.

At block 1125, the method 1100 may include receive, from the mobile device, a voice call session initiated according to a configuration based at least in part on the availability of the service. For example, the receiving may be performed at 230-235, 340-345, 455-460, as described above with reference to FIG. 2, 3, or 4, respectively.

In some embodiments, the operations at blocks 1105, 1110, 1115, 1120, or 1125 may be performed by service manager 510 described with reference to FIG. 5A, 5B or 7. Nevertheless, it should be noted that the method 1100 is just one implementation and that the operations of the method 1100 may be rearranged or otherwise modified such that other implementations are possible.

Figure 12:
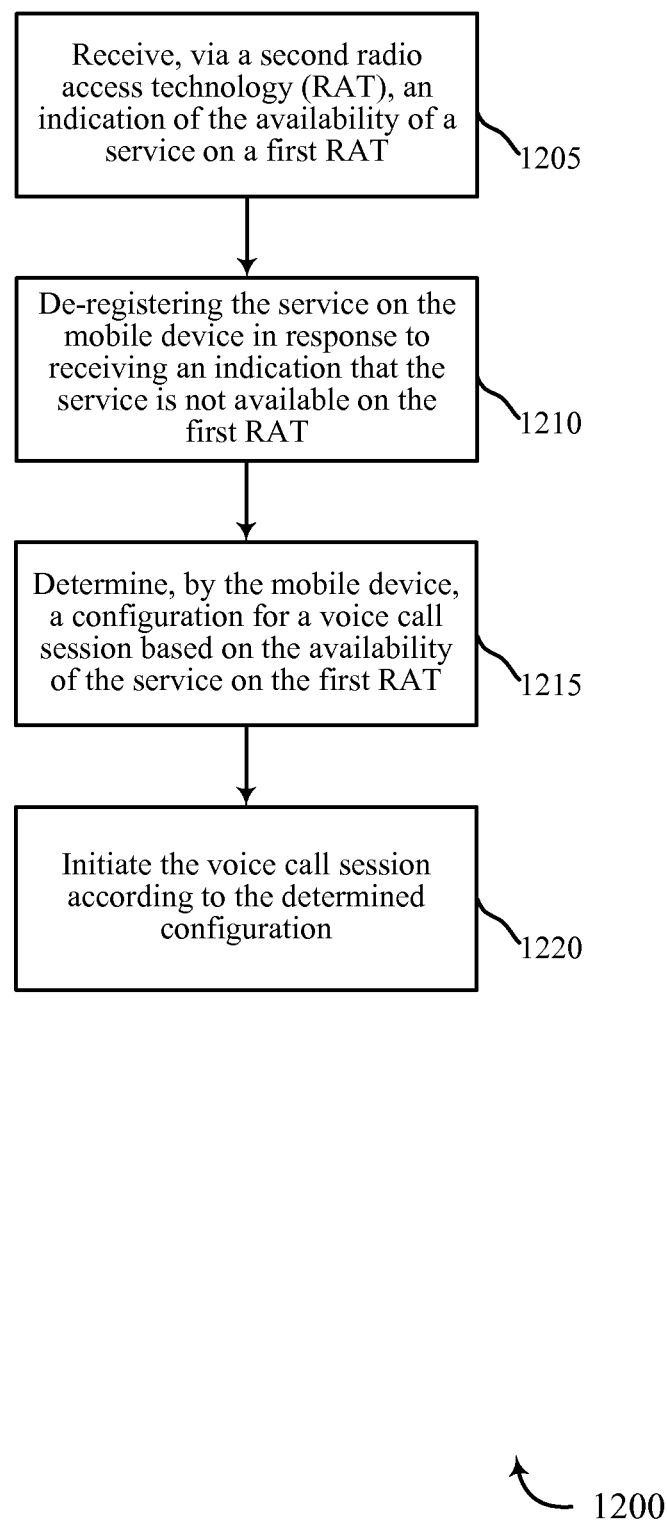
FIG. 12 shows a flowchart diagram of an illustrative method for wireless communications.

FIG. 12 shows a flowchart diagram of an illustrative method 1200 for wireless communications according to aspects of the principles described above. The method 1200 may be implemented by a mobile device 115 described above with reference to FIG. 1, 2, 3, 4, 5A or 5B and/or an apparatus 115 of FIG. 8. In some examples, a mobile device 115 or an apparatus 115 may execute sets of codes to control the functional elements of the multimode AP to perform the functions described below.

At block 1205, the method 1200 may receive, via a second RAT, an indication of the availability of a service on a first RAT. For example, the received indication may be performed at 220, 320, 445, as described above with reference to FIG. 2, 3, or 4, respectively.

At block 1210, the method 1200 may De-registering the service on the mobile device in response to receiving an indication that the service is not available on the first RAT. For example, the re-registration may be performed at 225, 325, 450, as described above with reference to FIG. 2, 3, or 4, respectively.

At block 1215, the method 1200 may include determine, by the mobile device, a configuration for a voice call session based on the availability of the service on the first RAT. For example, the determination may be performed at 225, 325-330, 450, as described above with reference to FIG. 2, 3, or 4, respectively.

At block 1220, the method 1200 may include initiate the voice call session according to the determined configuration. For example, the initiation may be performed at 230-240, 340-350, 455-465, as described above with reference to FIG. 2, 3, or 4, respectively.

In some embodiments, the operations at blocks 1205, 1210, 1215, or 1220 may be performed by the voice call session manager 610 described with reference to FIG. 6A, 6B or 8. Nevertheless, it should be noted that the method 1200 is just one implementation and that the operations of the method 1200 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
determining, by a multimode access point, that a service is available for a mobile device and that a first of a plurality of radio access technologies (RATs) is active for a backhaul connection to provide the service; and
providing, to the mobile device via a second radio access technology (RAT), an indication that the service is available and that the first of the plurality of RATs is active for the backhaul connection to provide the service.

2. The method of claim 1, wherein providing the indication that the service is available comprises:
sending a beacon to the mobile device via the second RAT.

3. The method of claim 2, wherein the beacon comprises a first information element indicative of the first RAT being active for the backhaul connection to provide the service and a second information element indicative of the service being available on the first RAT.

4. The method of claim 3, wherein the first RAT is a cellular communications network and the service is a voice over Long Term Evolution (LTE) (VoLTE) service.

5. The method of claim 1, wherein determining that the service is available comprises:
intercepting a message from a network entity to the mobile device;
modifying an information element included in the message to indicate availability of the service on the first RAT; and
forwarding the message with the modified information element to the mobile device.

6. The method of claim 5, wherein the message comprises a general advertisement service initial response message.

7. The method of claim 5, wherein the information element is a connection capability information element.

8. The method of claim 1, wherein the first RAT comprises a cellular communications network and the second RAT comprises a wireless local area network.

9. The method of claim 1, wherein the service is a semi-persistent scheduling service.

10. An apparatus for wireless communication, comprising:
a service manager configured to determine, by a multimode access point, that a service is available for a mobile device and that a first of a plurality of radio access technology (RATs) is active for a backhaul connection to provide the service; and
a transmitter configured to provide, to the mobile device via a second radio access technology (RAT), an indication that the service is available and that the first of the plurality of RATs is active for the backhaul connection to provide the service.

11. The apparatus of claim 10, wherein the transmitter configured to provide the indication that the service is available is further configured to:
send a beacon to the mobile device via the second RAT.

12. The apparatus of claim 11, wherein the beacon comprises a first information element indicative of the first RAT being active for the backhaul connection to provide the service and a second information element indicative of the service being available on the first RAT.

13. The apparatus of claim 12, wherein the first RAT is a cellular communications network and the service is a voice over Long Term Evolution (LTE) (VoLTE) service.

14. The apparatus of claim 10, wherein the service manager is configured to determine that the service is available is further configured to:
intercept a message from a network entity to the mobile device; and
modify an information element included in the message to indicate availability of the service on the first RAT; and
wherein the transmitter is further configured to forward the message with the modified information element to the mobile device.

15. The apparatus of claim 14, wherein the message comprises a general advertisement service initial response message.

16. The apparatus of claim 14, wherein the information element is a connection capability information element.

17. The apparatus of claim 10, wherein the first RAT comprises a cellular communications network and the second RAT comprises a wireless local area network.

18. The apparatus of claim 10, wherein the service is a semi-persistent scheduling service.

* * * * *